(12) United States Patent  
Monroe

(10) Patent No.: US 8,387,493 B2  
(45) Date of Patent: Mar. 5, 2013

(54) MODULAR LATHE BED SYSTEM

(76) Inventor: Thomas P. Monroe, Temple, TX (US)

( * ) Notice: Subject to any disclaimer, the term of this patent is extended or adjusted under 35 U.S.C. 154(b) by 284 days.

(21) Appl. No.: 12/906,340

(22) Filed: Oct. 18, 2010

(65) Prior Publication Data

US 2012/0090437 A1  Apr. 19, 2012

(51) Int. Cl.
*B23B 17/00* (2006.01)
*B23B 3/06* (2006.01)

(52) U.S. Cl. .......................... 82/149; 408/234

(58) Field of Classification Search .................... 82/149, 82/142, 148, 153, 132, 135, 136; 408/234, 408/236, 237
See application file for complete search history.

(56) References Cited

U.S. PATENT DOCUMENTS

| | | | |
|---|---|---|---|
| 2,473,306 A * | 6/1949 | Schreiber | 82/124 |
| 3,316,946 A | 5/1967 | Ryan et al. | |
| 3,875,830 A | 4/1975 | Lechot | |
| 3,926,078 A | 12/1975 | Ishizuka et al. | |
| 4,087,890 A | 5/1978 | Ishizuka et al. | |
| 4,246,813 A * | 1/1981 | Grachev et al. | 82/127 |
| 4,612,832 A * | 9/1986 | Ushigoe et al. | 82/129 |
| 4,719,676 A * | 1/1988 | Sansone | 29/27 A |
| 4,840,095 A * | 6/1989 | Nussbaumer et al. | 82/117 |
| 5,152,201 A * | 10/1992 | Izawa | 82/1.11 |
| 5,289,622 A * | 3/1994 | Minagawa | 29/27 R |
| 5,758,554 A * | 6/1998 | Miyano | 82/1.11 |
| 5,964,016 A * | 10/1999 | Ito et al. | 29/27 C |
| 7,451,533 B2 * | 11/2008 | Kawasumi et al. | 29/27 C |
| 7,849,769 B2 * | 12/2010 | Akiyama | 82/121 |
| 8,122,795 B2 * | 2/2012 | Goll | 82/1.11 |
| 2002/0129685 A1 | 9/2002 | Schmitter | |

* cited by examiner

*Primary Examiner* — Will Fridie, Jr.
(74) *Attorney, Agent, or Firm* — Nathan H. Calvert

(57) ABSTRACT

A modular lathe bed system is provided including various lathe designs for incorporating the modular lathe bed into a lathe. The bed system includes a machine mounting block design which may be used to support the lathe headstock, cross-slide, and tailstock. A sliding lock system secures and stabilizes the machine mounting blocks, allowing them to slide or be locked in place. The machine mounting blocks move on a modular way bed including two upright bed tracks. The bed tracks and their connecting structure allow for a modular and extendible way bed.

20 Claims, 11 Drawing Sheets

MODULAR LATHE BED SYSTEM

FIELD OF THE INVENTION

The present invention relates to designs for shop lathes or metalworking lathes, and specifically to an improved modular lathe bed system for the same.

BACKGROUND

A lathe is a machine tool that spins a workpiece to shape it by applying tools to the workpiece to perform operations that are typically symmetric around an axis of rotation. Lathes are used in woodworking, metalworking, and other areas. The typical lathe has a bed, which is preferably one or more horizontal beams along which certain lathe parts move. A lathe may have a stand which sits on the floor and raises the lathe bed to a suitable height for working.

In the traditional lathe design, a headstock is provided at one end of the bed (almost always the left side when facing the front of the lathe). A spindle which rotates on bearings in the headstock is on a horizontal axis parallel to the bed. The headstock powers the spindles to provide rotating motion to the workpiece, which is gripped by a chuck along the exterior of the headstock. In the typical modern lathes, the power source for the rotating spindle is an electric motor, attached to the headstock in some way. In addition to the spindle, the headstock often contains parts to adjust the motor speed to provide various spindle rotating speeds. This may be a gear train or some type of pulley arrangement. Sometimes the motor has electronic speed controls that can perform this function without a complex gearing arrangement.

At the other end of the bed from the headstock, the typical lathe has a tailstock, which can be repositioned by sliding it along the bed and locking it in place with a locking nut. The tailstock contains a barrel usually used for gripping of various types of tooling, or holding a center for supporting thin shafts while they are being turned on the lathe.

Between the headstock and tailstock, metalworking lathes have a carriage (comprising a saddle and apron). The carriage is topped with a cross-slide, which is a flat piece that sits crosswise on the bed. A leadscrew moves the cross-slide along the bed. For example, sitting atop the cross-slide is usually another slide called a compound rest, which provides 2 additional axes of motion, rotary and linear. Atop the compound rest there is typically a toolpost, which holds a cutting tool for removing material from the workpiece upon which the lathe is operating. In a typical shop lathe system or typical metalworking lathe, the headstock is fixed in place relative to the lathe bed, and the carriage and tailstock move relative to the headstock to perform lathe operations. In a metalworking lathe, a hardened cutting tool is mounted to the toolpost and moved against the workpiece to remove metal from the workpiece. The toolpost is operated by leadscrews that can reposition the tool along multiple dimensions.

The construction of a typical metalworking lathe fixes the headstock in place at the left end of the bed, and allows movement of the carriage and tailstock along the bed. The lathe is typically manufactured with the bed joined to the headstock in a manner that does not allow replacement or reconfiguration by the lathe operator.

In operation, a metalworking lathe produces metal shavings and cuttings or other waste pieces that may get caught on the bed and cause damage to the sliding surface of the bed. Also, the bed may be damaged or dented by impacts from heavy pieces of metal being worked on in the lathe. A damaged bed requires expensive resurfacing that often entails excessive downtime in the lathe operating schedule. Further, in operation, a typical lathe requires removing the workpiece from the lathe to perform additional milling or drilling operations that do not have the same symmetrical axis as the operations being performed on the lathe. Precision alignment and speed of operations often suffer with such repositioning of the workpiece, which may occur multiple times during the metalworking process.

SUMMARY OF THE INVENTION

A modular lathe bed system is provided including various lathe designs for incorporating the modular lathe bed into a lathe. The bed system includes a machine mounting block design which may be used to support the lathe headstock, cross-slide, and tailstock. A sliding lock system secures and stabilizes the machine mounting blocks, allowing them to slide or be locked in place. The machine mounting blocks move on a modular way bed including two upright bed tracks. The bed tracks and their connecting structure allow for a modular and extendible way bed.

In one embodiment, the system is used in a lathe, the lathe including a headstock with a drivable rotatable chuck providing a spindle axis, a tailstock mounted opposite the headstock along the spindle axis, and a carriage adapted to move longitudinally between the headstock and tailstock. The carriage is adapted to hold a tool bit for operating on a rotating workpiece. The lathe bed is provided in the form of a modular lathe bed track system including a base, and two bed tracks that are removably attached to the base and extend under the headstock, carriage, and tailstock. Each bed track includes a shaped upper track surface, an accessory slot formed between an upper portion of the bed track and an accessory ledge, the accessory ledge having a downward-facing surface. The bed tracks are attached to each other and fixed in relative position with first and second end blocks positioned at first and second ends of the modular lathe bed track system. The modular lathe bed track system also includes a first repositionable machine mounting block assembly supporting the headstock and resting on the two bed tracks. The machine mounting block assembly includes a machine mounting block having two slots shaped to match the bed track upper track surfaces, a sliding lock block attached to the machine mounting block and positioned under the machine mounting block and adapted to move against the accessory ledge downward-facing surface in a manner to stabilize the machine mounting block, a sliding lock bar provided in a recess formed in the sliding lock block, and at least one locking bolt positioned to enable pressure to be applied from the sliding lock bar on the ledge downward-facing surface. A second, similar, machine mounting block assembly supports the tailstock, and a third machine mounting block assembly supports the carriage.

Preferably, the sliding lock block is adapted to move against the accessory ledge downward-facing surface by applying pressure on the downward-facing surface through bearings mounted along edge of the sliding lock block. In some versions, the two bed tracks extend past the headstock on a side opposite the tailstock, and further include a leadscrew, feed rod, and on off rod that are slidable along a sliding rod support system attached to a front one of the bed tracks. The sliding rod support system may include an end support block moveable along an extension attached to the front bed track, allowing the ends of the leadscrew, feed rod, and on off rod to move.

In other embodiments of the invention, the modular lathe bed track system may be provided as a separate commercial kit to retrofit, modify, extend, or construct a lathe. In still other embodiments, the bed tracks and their associated end blocks and cross supports may be provided separately to enable extending the bed of an existing lathe. This may be used, for example, to increase the bed length (right side of the lathe) or extend the lathe bed behind (to the left of) the headstock to provide ability to reposition the headstock to the left.

These and other advantages and features of the invention will be apparent from the following description of the preferred embodiments, considered along with the accompanying drawings.

DETAILED DESCRIPTION OF PREFERRED EMBODIMENTS

Figure 1:
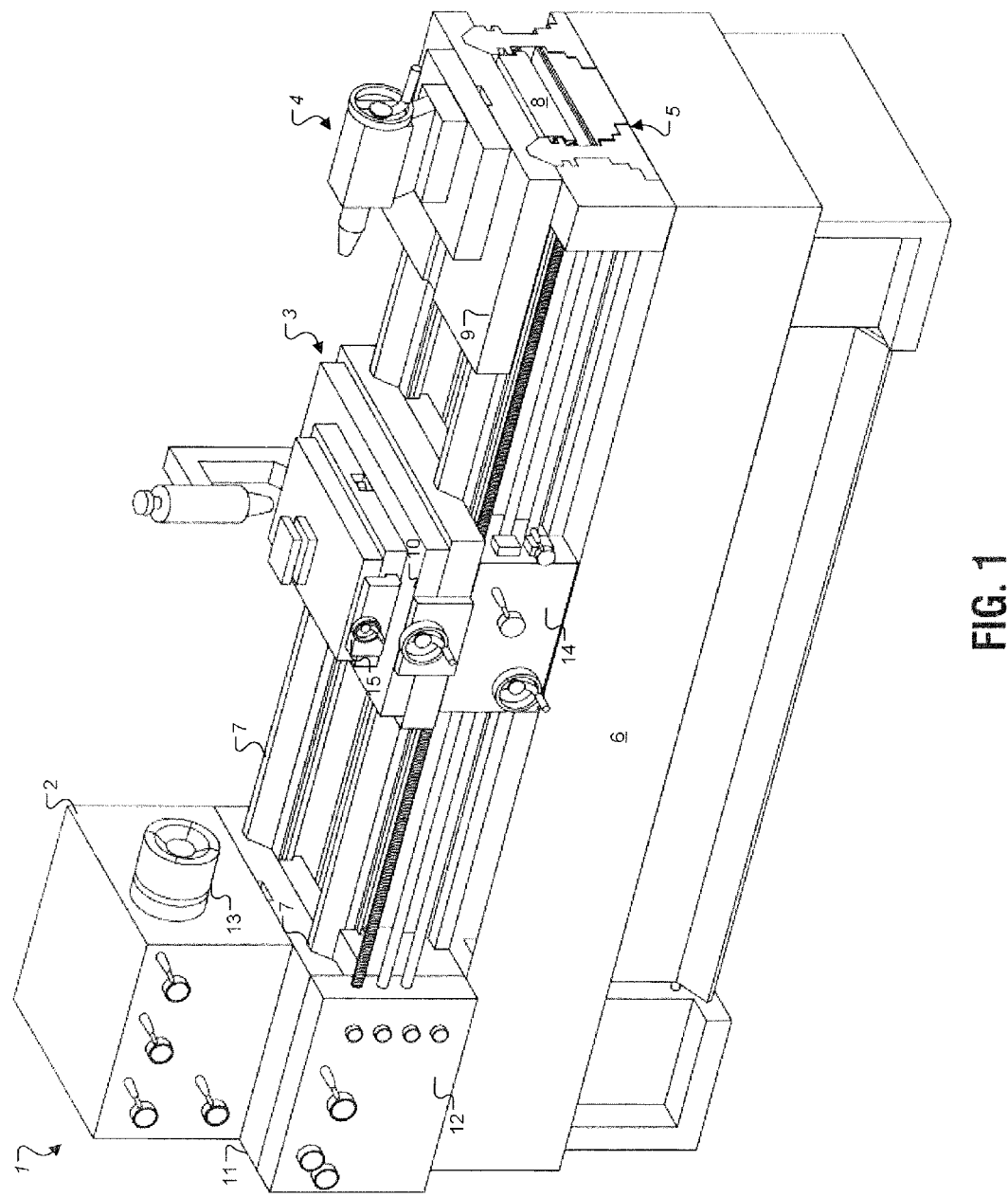
FIG. 1 shows a perspective view of a lathe 1 according to one embodiment of the invention.

FIG. 1 shows a perspective view of a lathe 1 according to one embodiment of the invention. In the depicted embodiment, a shop lathe 1 is provided having an improved lathe bed comprising a modular lathe bed track system 5 ("modular bed 5", "bed 5") including two bed tracks 7 arranged side by side in a position that in a typical lathe would be occupied by a fixed lathe bed comprising one or more horizontal beams on which the carriage 3 and the tailstock 4 would be movable.

As with typical metalworking lathes, the depicted lathe 1 rests on a stand or base 6 and includes a headstock 2 with a drivable rotatable chuck 13 providing a spindle axis. The headstock includes a gearbox 12 operable to rotatably drive the depicted threaded leadscrew and thereby move the carriage during operation of the lathe 1. The chuck 13 is adapted to hold a workpiece and rotate it to provide various operations such as turning, facing, inside turning, boring, or other shaping. Lathe 1 also includes a carriage 3 comprising a machine mounting block 10 (which may replace the traditional saddle structure) and saddle gearbox 14 topped with a cross-slide 15, which sits crosswise on the bed 5. A leadscrew moves the cross-slide along the bed. Other known features of a lathe carriage may of course be employed in various embodiments of the current invention. For example, sitting atop the cross-slide 15 is usually another slide called a compound rest, which provides 2 additional axes of motion, rotary and linear. Atop the compound rest there is typically a toolpost, which holds a cutting tool for removing material from the workpiece upon which the lathe 1 is operating.

In a typical shop lathe system or typical metalworking lathe, the headstock 2 is fixed in place relative to the lathe bed, and the carriage and tailstock move relative to the headstock to perform lathe operations. The depicted system, in operation, operates similarly. However, it is adapted to be reconfigured in a way allowing various adjustments and positions that are difficult to achieve with a traditional metalworking lathe. The details and benefits of this feature will be further described below.

That depicted modular lathe bed track system 5 also provides various improvements over existing lathe bed designs. The depicted base 6 is typically metal and provides a solid base surface on which the modular bed 5 can be mounted. In preferred embodiments, modular lathe bed track system 5 is provided for the particular purpose of allowing users who have an existing metalworking (or, in some variations, a mill) with a bed foundation to strengthen their machine and increase its machining size capacity far beyond that originally provided. Further, the features described herein may also be applied to multi-purpose wood lathe machines and for other lathe machines of all types, but reference will be made generally to a preferred embodiment of a metalworking lathe. One deficiency in existing lathe designs, and especially the imported lathes frequently used as shop lathes in the U.S., is that in order to increase the machining diameter, the lathes include a gap next to the headstock which greatly weakens the bed foundation and leads to "chatter" while machining. Such a design frequently causes the lathe tool to have a tendency to be pulled under the material in many machining operations. Such phenomenon is especially felt in the use of the cutoff tool. The present system, in preferred embodiments, eliminates such a gap. It allows the headstock motor and quick change gearbox 12, since all are mounted to the machine mounting block 11, to travel to any point on the bed tracks and to be locked there. Also, since the headstock can be moved, the way beds may extend out to the left, or the opposite side of the headstock from the depicted carriage 3. Such an arrangement can be used for many purposes, such as to mount any number of dial indicators behind the headstock for dialing in material concentric with the centerline of the lathe spindle. A steady rest can also be mounted on such an extension, to steady long pieces of material while machining. Further, a frame may be mounted to the modular bed 5 with a free spinning three or four jaw chuck lined up with the concentric centerline of the lathe spindle for a very quick holding of long, small diameter material behind the headstock. A second cross-slide machine may also be built behind the headstock.

Other features of the modular lathe bed track system 5 include the machine mounting blocks, at reference numerals 9, 10, and 11 which hold the tailstock, carriage, and headstock respectively in the depicted embodiment. These include an improved machine mounting block locking system which will be further described below. The machine mounting blocks 9, 10, and 11 slide along the depicted bed tracks 7 to allow operation and reconfiguration of the lathe 1.

Figure 2A:
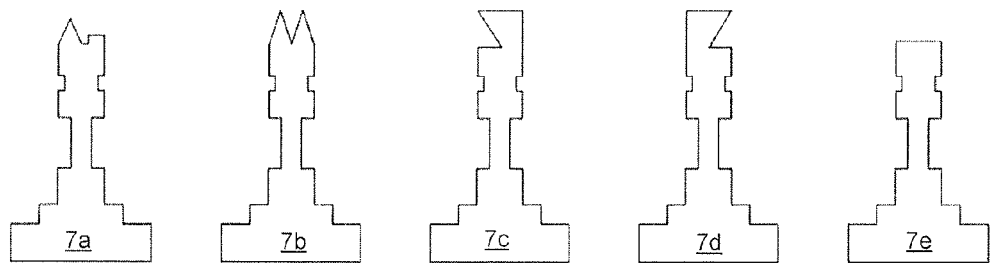
FIG. 2A depicts several cross sections of alternative embodiments having different designs for the track surface 51.

FIG. 2A depicts several cross sections of alternative embodiments having different designs for the track surface 51.

Figure 2B:
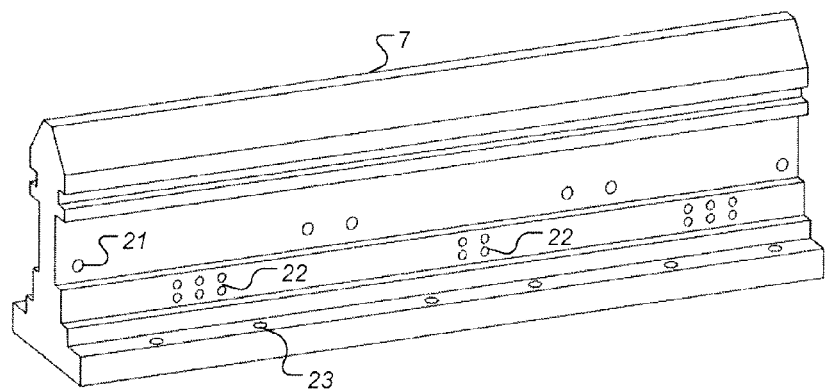
FIG. 2B shows a perspective view of a single bed track 7 according to a preferred embodiment.

FIG. 2B shows a perspective view of a single bed track 7 according to a preferred embodiment.

Figure 2C:
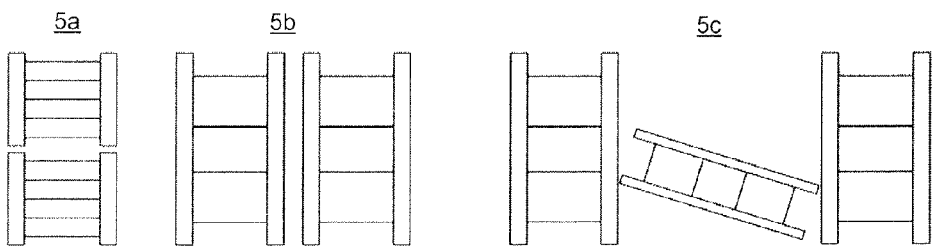
FIG. 2C shows a top layout view of three possible arrangements of modular lathe bed systems.

FIG. 2C shows a top layout view of three possible arrangements of modular lathe bed systems, but many other arrangements are possible. Arrangement 5a provides that a modular lathe bed may be added as an extension on the end of another lathe bed or modular lathe bed to provide an extended end length bed arrangement. Arrangement 5b shows two modular lathe beds arranged parallel to each other. And, arrangement 5c shows how three modular lathe beds may be arranged with two in parallel separated by a third placed at an angle, for example. Since the bed tracks 7 in the system are machined and ground to the same exact dimensions, they are interchangeable. This allows the bed ways to be used in many configurations. As long as the bed ways are mounted on a solid base, they can be right angles, or at any angle to each other, or lined up parallel to each other in any number, such as two, three, four, or even six. Four is the typical configuration. Such consideration would allow a lathe to be mounted on the front two modular beds, and a mill or crossslide table to be mounted on modular beds three and four. With a crossslide table mounted on beds three and four, the system can have a horizontal milling-drilling head to be lined up with the concentric center line of the lathe spindle on modular beds one and two. This allows the operator to perform milling-drilling operations on the materials mounted in the lathe without having to move or remove the material to perform milling in another machine. Once removed, in many cases it can be difficult to reinstall back in the lathe and maintain concentricity with the lathe spindle. A vertical mill head may also be mounted on a machine mounting block lined up with the concentric center line of the lathe spindle and perform milling-drilling operations on material in the lathe, just as with the horizontal mounted mill-drill head. One arrangement of the modular beds herein provides six way beds parallel to each other and at the same height. This will allow a lathe to be mounted on one and two, a horizontal or vertical mill head to be mounted on three and four and another lathe to be used on five and six. This would allow the mill head to swivel and perform milling-drilling and even grinding operations on either lathe.

The way beds are of the same dimensions, allowing extensions to be added to either end of the existing lathe. As long as the bed is parallel and maintained at the same height, multiple machines may be used on the same bed in a straight line.

Figure 5:
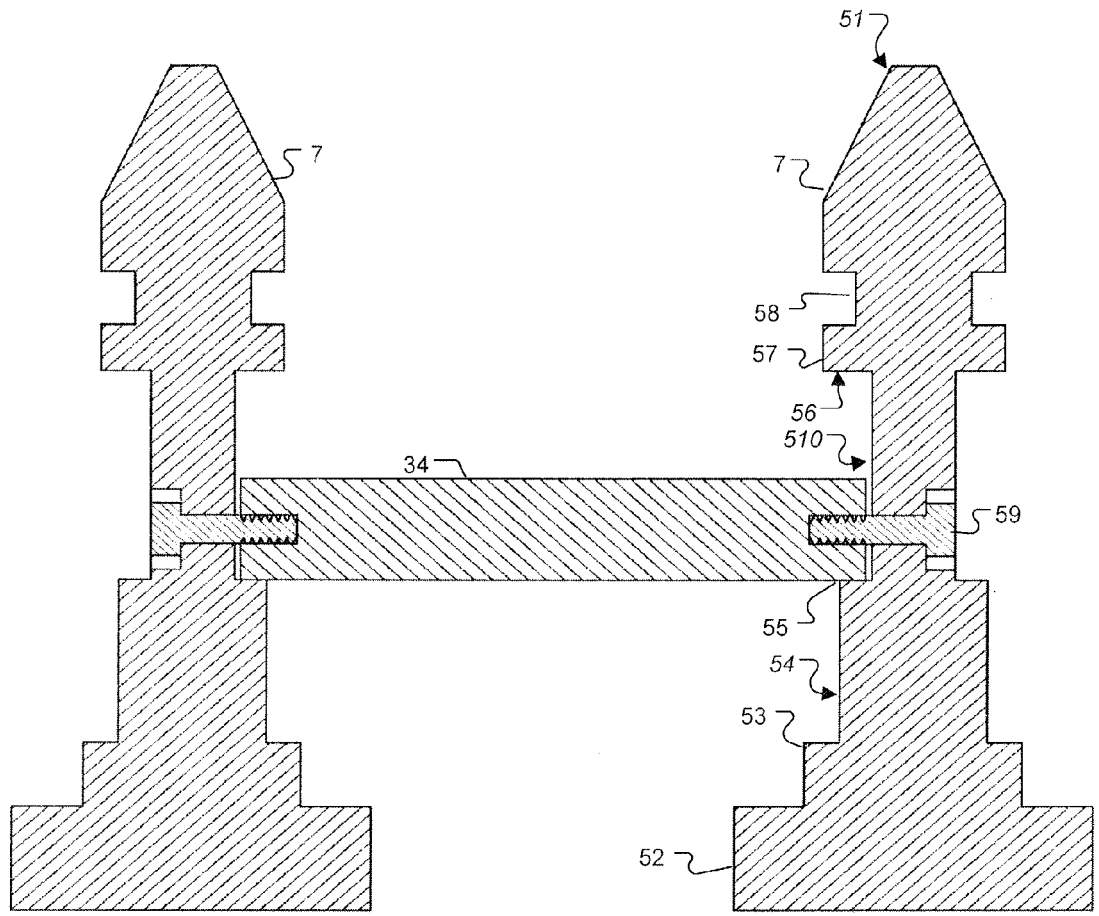
FIG. 5 shows a cross section of a partially assembled modular bed including two upright bed tracks separated by a top inside alignment brace.

Referring now to FIG. 1, FIG. 2B, and FIG. 5, a preferred construction of the bed tracks 7 is now described. FIG. 5 shows a cross section of a partially assembled modular bed 5 including two upright bed tracks 7 separated by a top inside alignment brace 34. Referring to FIG. 5, starting at the bottom of the bed tracks 7, a large wide horizontal surface called the track base 52 is provided, which allows the bed tracks 7 to rest on and be attached to a way base or a way connecting base 30 (FIG. 3A) for a strong mount on a floor stand of some kind. Above the track base 52 is the end block and way bed lower alignment shoulder 53. Above this is the end block and way bed upright alignment surface 54, which allows end blocks 38 (FIG. 3A) to be bolted between the bed tracks at both ends of the modular bed 5, preferably with 4 to 6 bolts. FIG. 2B shows bolt holes 22 provided for this purpose. (A similarly designed center block is also preferably bolted in the center at the location of the central bolt holes 22 depicted in FIG. 2B.) The end blocks 38 also have an inside and outside ledge which allows bolting to the way bed base. The inside ledge is depicted at the dotted line inside of the end block 38 of FIG. 3A. The outside ledge preferably rests on the track base 52 and lower alignment shoulder 53. Other designs may include end blocks that only rest on the track base 52. There are also preferably bolts at the center of end blocks 38 going into the way bed connecting base 30.

Above the upright alignment surface 54 is the top shoulder 55 for the top alignment braces 34. In a preferred embodiment, several top alignment braces 34 are spaced along the length of bed tracks 7 in a manner designed to provide alignment stability to the entire length of modular bed five. One preferred embodiment uses top alignment braces 34 spaced as needed for the full length of the bed of 12 inches or so apart. The top alignment brace 34 sits on the top shoulder and is bolted to both way beds with bolts 59 through the top upright surface 510 for the top alignment brace.

Figure 3A:
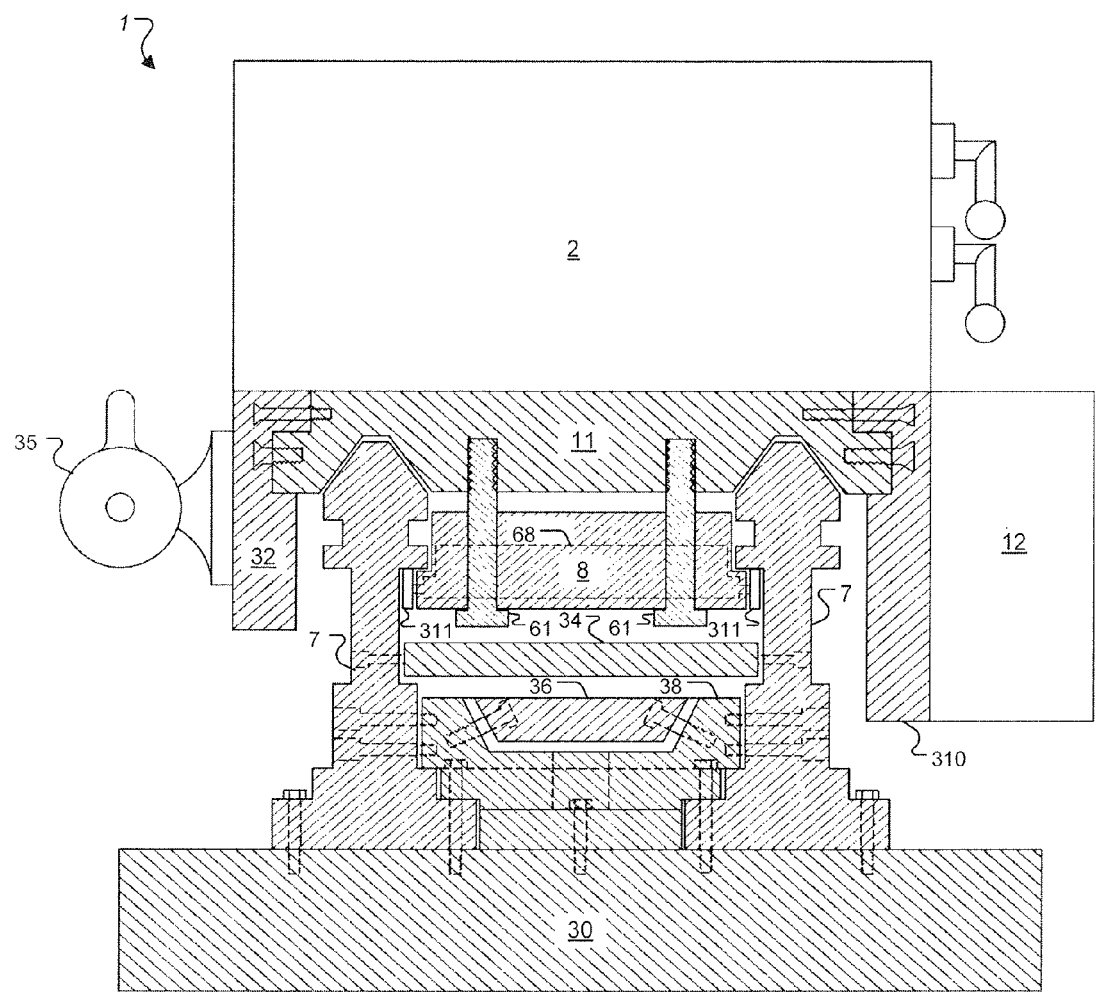
FIG. 3A shows a cross section of a lathe according to one embodiment taken across the headstock area of the lathe.
Figure 3B:
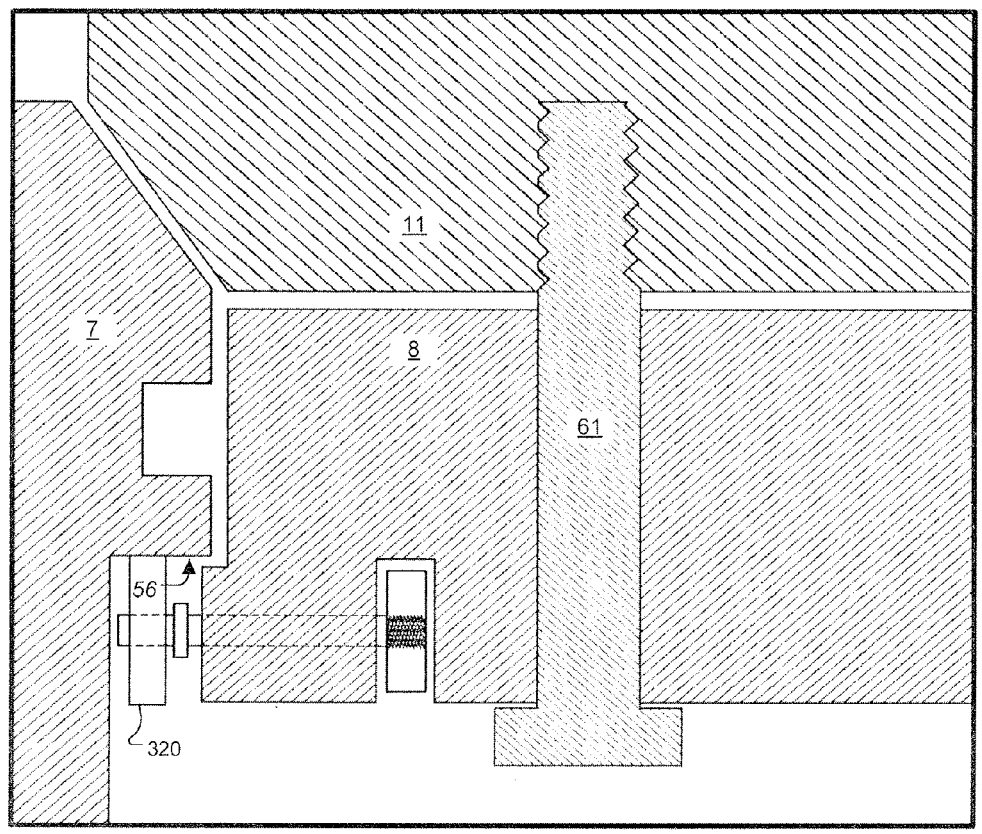
FIG. 3B shows a zoomed cross section of a bearing portion of a machine mounting block and sliding lock system.
Figure 4:
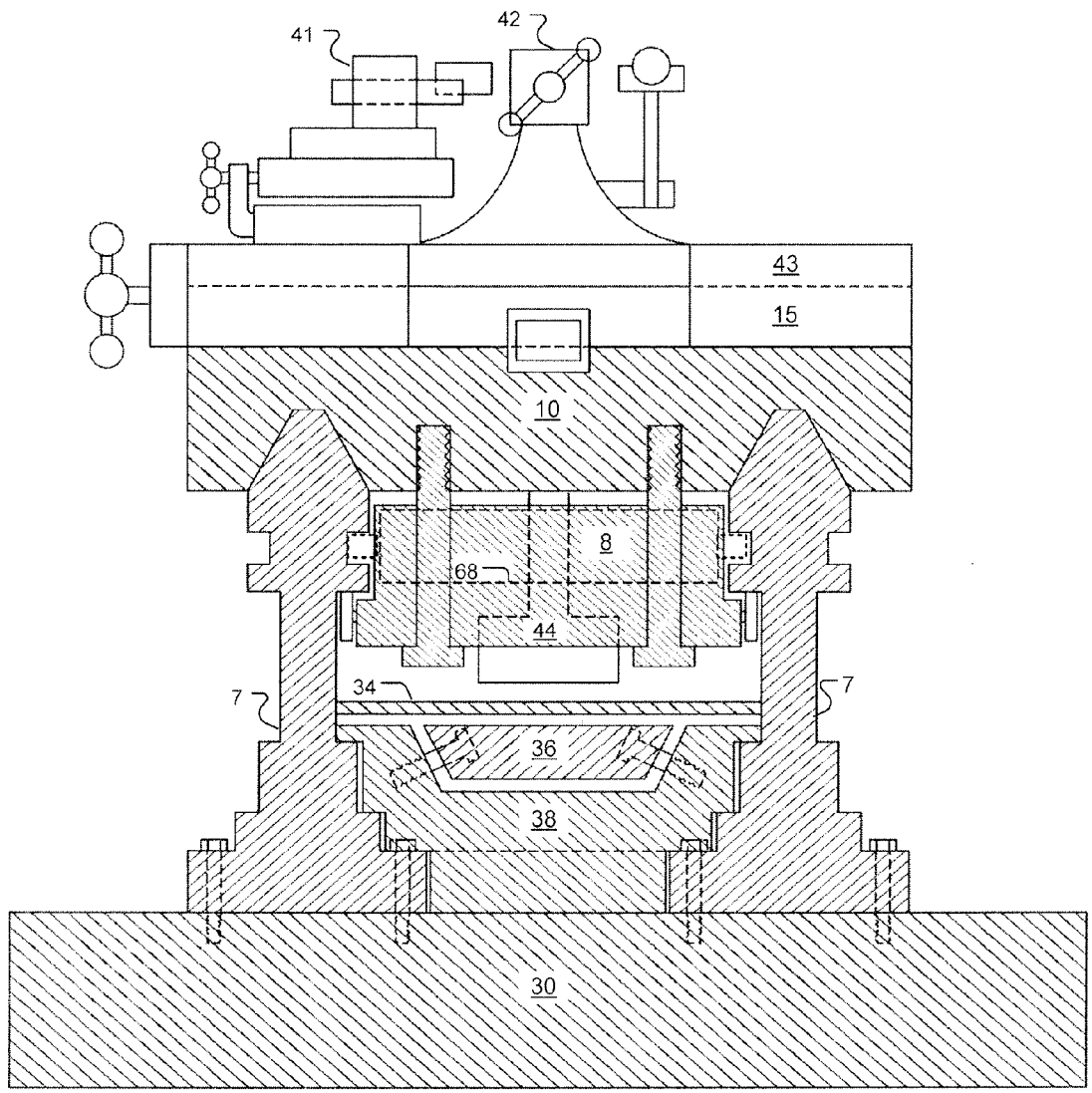
FIG. 4 shows a cross section taken through the carriage area of the lathe looking toward the tailstock according to one embodiment.

The next part of the bed tracks 7 is the bearing and locking surface 56 for the machine mounting blocks sliding lock block system (further described with respect to FIGS. 3A, 3B, and 4). This surface 56 is preferably formed by an accessory ledge 57 and comprises a downward facing surface of accessory ledge 57. In other designs, other suitable structures or features of bed tracks 7 may provide an appropriate downward-facing flat surface or shaped feature designed to receive locking force provided in an upward direction from the machine mounting block sliding lock block system. The bearing and locking surface 56 also serves on the outside as the bearing surface for mounting of the cross slide carriage saddle-rack gear mounting surface (interior of 14 in FIG. 1).

Still referring to FIG. 5 and FIG. 3A, above the accessory ledge 57 is the accessory slot 58, which is milled in both sides of the bed track 7 for mounting needed accessories such as dial indicators or other accessories too large to be attached to the metal bed tracks 7 with magnetic bases. In some embodiments, the accessory slot 58 may also receive a locking bar as part of the machine mounting block sliding lock block system. However, a preferred embodiment applies the locking bar against the bearing and locking surface 56, as further described below.

The last part of the track is the track surface itself, which may be referred to as a "way" or track surface 51. This is the upper portion of the bed tracks 7, and is formed with a triangular wedge-shaped cross section as shown in the preferred embodiment in FIG. 5. Track surface 51 preferably extends the length of bed track 7 as depicted in FIG. 2B. The way or track surface 51 can be of any type needed for the machine being mounted.

FIG. 2A depicts several cross sections of alternative embodiments having different designs for the track surface 51. The five cross sections shown are labeled as 7a-7e.

Referring again to FIG. 3A, as described above, the lower portion of the bed tracks 7 is separated by the end blocks 38 and the center block. These two items are similar except the center block does not need to be as deep as the end block. The end blocks 38 hold the two ways together by being bolted to the end block upright alignment surface with preferably 4 to 6 bolts depending on the size of the way beds. Preferably, the end blocks 38 are set in approximately 6 inches from the ends of the bed tracks 7, as is depicted by the end block bolt holes 22 shown in FIG. 2B (the distances are not drawn to scale). The end blocks 38 may also be bolted from the end block ledge to the way bed base 30 as shown by the central bolt of end block 38 in FIG. 3A. Preferably, there are bolts running down through the center of the end block 38 into the way bed connecting base 30. And lastly, end block top support brace 36 is bolted to the top of the end block 38. This piece is provided to stabilize the end block 38 and allow fittings for the depicted bolts between 36 and 38 which allows joining forces to be applied in a diagonal direction in the situation where the bolts can extend all the way into bed tracks 7 (not shown). It should be noted that, as shown in FIG. 3A, FIG. 4, and other figures herein, the drawings are provided with white spaces between, for example, items 36 and 38. This is only shown to help clarify the drawings, and the actual construction is preferably accomplished with a tight, interference fit between items 36 and 38, 38 and bed track 7, inside alignment braces 34 and bed track 7, and of course the machine mounting blocks (i.e. 11) and the track surface 51, which provides for a lubricated sliding fit on which the machine mounting block moves.

Above the end blocks 38 are the top inside alignment braces 34. These braces 34 may be used in some designs, as needed, to help keep the bed tracks 7 in alignment between the end blocks and the center block, preferably spaced at about 6 to 12 inches apart. They are bolted through the uprights surfaces for the top alignment braces using bolt holes 21 (FIG. 2B).

FIG. 3A shows a cross section of a lathe 1 according to one embodiment taken across the headstock area of the lathe. In general, while the parts will be further describe below, FIG. 3A shows a headstock 2 mounted on a machine mounting block 11, which is movable atop the bed tracks 7 that comprise the modular lathe bed system further described below. To the front side (right side of the drawing) of the depicted assembly is the quick change gearbox 12, attached to a mount 310 that is bolted to the machine mounting block 11. To the rear side of the depicted assembly (the left side of the drawing), a motor mount 32 holds a belt motor used in operation of the headstock 2.

FIG. 3B shows a zoomed cross section of a bearing portion of a machine mounting block and sliding lock system.

Figure 3C:
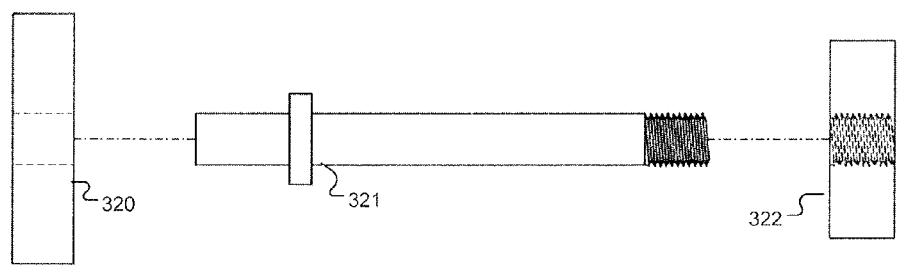
FIG. 3C shows an expanded bearing assembly.

FIG. 3C shows an expanded bearing assembly.

FIG. 4 shows a cross section taken through the carriage area of the lathe looking toward the tailstock according to one embodiment.

FIG. 5 shows a cross section of a partially assembled modular bed including two upright bed tracks separated by a top inside alignment brace.

Figure 6A:
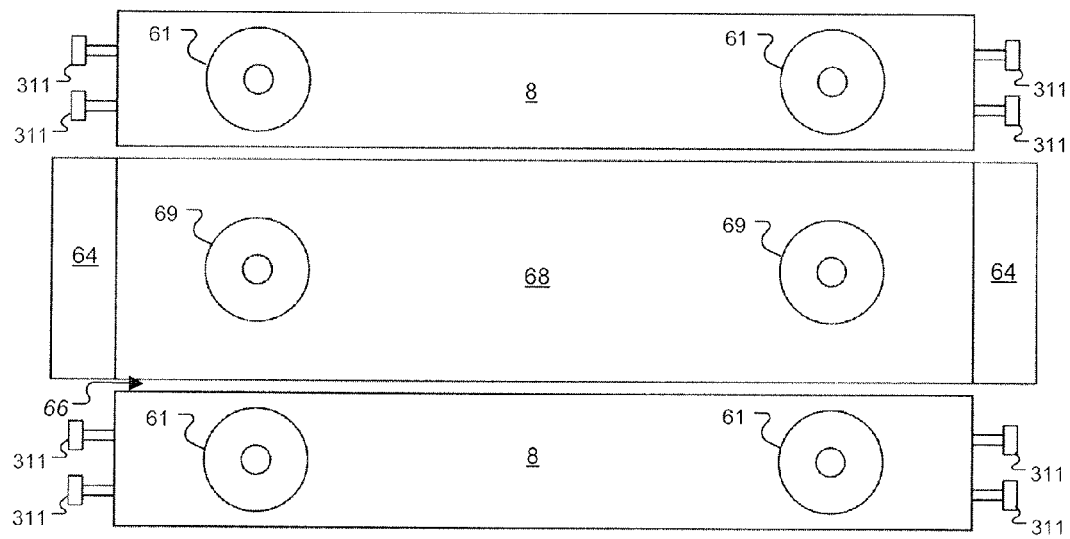
FIG. 6A shows a bottom view of a sliding lock block according to one embodiment of the invention.

FIG. 6A shows a bottom view of a sliding lock block according to one embodiment of the invention.

Figure 6B:
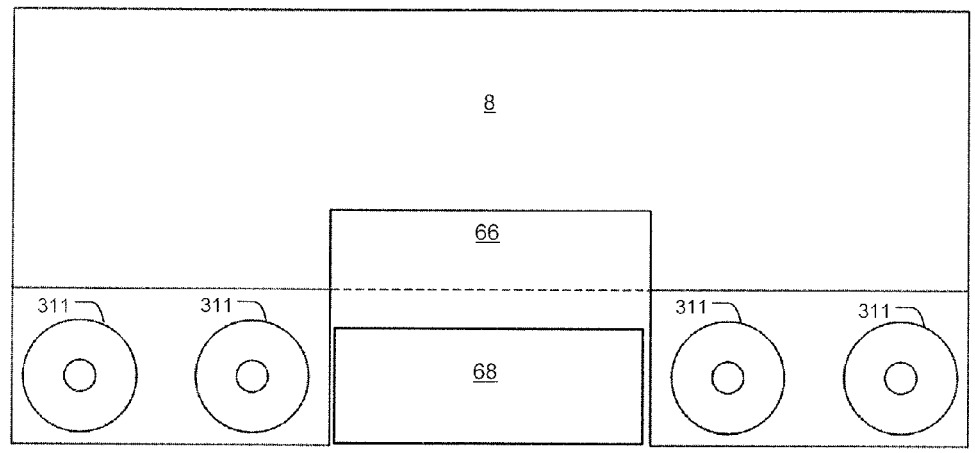
FIG. 6B shows a cross section view of a sliding lock block, taken in the longitudinal direction of the lathe, according to the same embodiment.

FIG. 6B shows a cross section view of a sliding lock block, taken in the longitudinal direction of the lathe, according to the same embodiment.

Referring to FIGS. 3A-C, FIG. 4, and FIGS. 6A-B, the machine mounting block sliding lock block system may now be described. This system includes the machine mounting blocks (11, 10, 9), their associated sliding lock blocks (8), and the locking bars and other pieces that join together to make a repositionable machine mounting block assembly which, in a preferred embodiment, goes with each of machine mounting blocks (11, 10, and 9). Other embodiments may, of course, use a more traditional carriage, tailstock, or headstock arrangement in place of any one or two of these three machine mounting block assemblies. The machine mounting block sliding lock block system is what allows anything mounted on the machine mounting blocks to move anywhere on the modular bed 5 and be locked into place. The machine mounting blocks (11, 10, 9) carry their respective machine parts (headstock, carriage, tailstock) along the tracks 7 of the modular way bed 5. The underside of each machine mounting block is shaped (preferably machined and ground) to a smooth sliding fit atop the two track surfaces 51 of the bed tracks 7. This may be seen, for example, at the cross section of FIG. 3A, where the machine mounting block 11, which holds the headstock 2, is shown fitting to the top of bed track 7.

Attached to the lower side of the machine mounting block 11 is the sliding lock block 8, shown attached with bolts. (Preferably a gap between parts 11 and 8 exists as shown in this drawing, but is not necessarily to scale.) Generally, the functions of the sliding lock block 8 are to (a) lock the machine mounting block 11 in place when desired and (b) to apply a squeezing pressure against the bearing and locking surface 56 to stabilize the machine mounting block while still allowing sliding movement during those times when the lock is not applied. To accomplish this, the sliding block also includes 4 to 6 bearings along each edge which roll against the bearing and locking surface 56 in order to apply pressure while still allowing movement. This allows the machine mounting blocks to move smoothly down the bed tracks 7 without vertical slack.

A more detailed view of the bearing in sliding lock block 8 and its interaction with the bearing and locking surface 56 of bed track 7 can be understood from FIG. 3B, which shows a zoomed cross section of a bearing portion of a machine mounting block and sliding lock system. FIG. 3C shows an expanded bearing assembly. Referring to both FIGS. 3B and 3C, sliding lock block 8 is shown attached to a machine mounting block 11 with a tension and mounting bolt 61. A precision hole through the depicted flange in sliding lock block 8 allows the insertion of a precision bearing stud 321 for holding a bearing 320. A bearing locking nut 322 holds the precision bearing stud 321 in place in the sliding lock block 8. As can be seen in the large view in FIG. 3B, the bearing 320 rests against the bearing and locking surface 56 to provide stabilizing pressure holding the machine mounting block 11 firmly to track surface 51 of bed track 7. Some embodiments may also provide that the wall of sliding lock block 8 slide against the inner side of bed track 9, while others will provide for clearance.

Referring to FIGS. 6A and 6B to further describe the sliding lock block system, a sliding lock bar 68 is provided in a recess 66 formed in the locking piece 8. Locking bolts 69 are positioned in the sliding lock bar 68 to enable pressure to be applied from the sliding lock bar to the bearing and locking surface 56. The underside of sliding lock block 8 is machined so that the independent lock bar 68 can be set in the middle of the sliding lock block 8, between the bearings and the two tension and mounting bolts 61 of sliding lock block 8. The sliding lock bar 68 also includes a ledge 64 on each side that will, when sliding, preferably not touch the bearing and locking surface, but instead will slide by it with a slight clearance. Sliding lock bar 68 will have one bolt on each side between the sliding block's tension bolts 61. When tightened, the ledge 64 will bear against bearings and locking surface 56, thus locking machine mounting block 11 in place.

Some embodiments of a machine mounting block, such as that used with the lathe cross-slide (on carriage 3), may not need a sliding lock bar because a separate lock system will be used as on conventional lathe beds.

Referring again to the upper part of the machine mounting block sliding lock block system, the machine mounting blocks 9, 10, 11, will have a matching way machined and ground into it to match the bed track 7. As can now be understood, the machine mounting blocks will be held in place with sliding lock blocks 8. Preferably, each machine mounting block will be machined to fit whatever is mounted atop it. Most commonly, this will be the lathe headstocks 2 with motor 35 and quick change gearbox 12, the cross-slide 15 with saddle gearbox 14 and tailstock. In versions of the invention where the modular bed system used herein is applied to a mill (FIG. 8, for example), the machine mounting block would be machined to hold the milling table and the milling head on top.

Referring specifically to FIG. 4, this cross section shows the machine mounting block 10, also shown in FIG. 1, with the associated carriage fixtures which may take any form typically used in a metalworking lathe carriage. Depicted is toolpost 41 resting on cross-slide table 43, which moves horizontally atop cross-slide 15. Other cross-slide accoutrements may provide another axis of linear movement, or rotational movement as is commonly known in lathe carriage construction. The view also shows the top portion of the tailstock 42, pointing toward the perspective in the view.

The machine mounting block 10 includes a sliding lock block system in this embodiment having a sliding lock block 8 with an alternative design and location for the locking bar 68, as compared to that described with respect to FIG. 3A. Specifically, the locking bar 68 depicted in FIG. 4 in dotted lines is positioned and adapted to extend a flange at each side into the accessory slots formed in bed tracks 7. The locking pressure with a locking bar tightened is therefore, in this version, applied to the upper side of the accessory slot as opposed to the bearing and locking surface as in the alternative embodiment. Further in this version, the locking bolt scheme employed with locking bar 68 uses a single large locking bolt 44 positioned in the center of the sliding lock block system, instead of each edge as depicted in the previous embodiment described with respect to FIG. 6A.

It should also be mentioned with regard to FIG. 4 that the end block 38 depicted herein may include a flange as shown that extends above the top shoulder 55 (FIG. 5) of bed track 7 to apply greater stabilizing forces to the assembly of bed tracks 7 as a modular way bed. Alternately, as shown in FIG. 3A, the end block 38 may not extend over the top shoulder 55. In either event, it is preferred that the top alignment braces 34 rest on the top shoulder 55 as shown in FIG. 5. The depicted view separates these components only for clarity of the drawing. The top alignment brace 34 depicted in FIG. 4 is behind end block 38.

Figure 7:
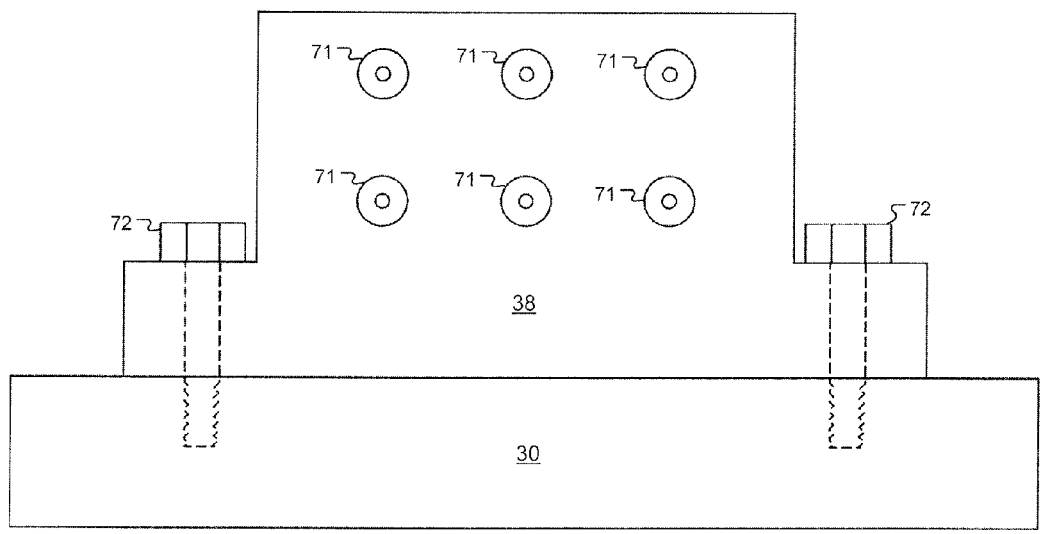
FIG. 7 shows a cutaway view of an end block from the front of the lathe.

FIG. 7 shows a view of an end block 38 from the front of the lathe 1. The bed track 7 is left out of this view. The depicted end block 38 is bolted to the way base 30 with bolts 72 that pass through an end block bolt flange. Several bed track attachment bolts 71 attach end block 38 to the bed tracks 7 at the front and back of the end blocks 38.

In view of the above disclosure, one of ordinary skill in the art can now appreciate several benefits of how the current system may be used in operation. First, since the headstock 2 can be moved anywhere on the modular bed 5, a number of tools and lathe accessories can be deployed and used to the rear of the headstock. For example, an extra three-jaw chuck can be mounted to the rear of the headstock to allow accurate and stable clamping for long material extending out the back of the headstock. Dial indicators can be easily mounted to the bed. Further, large indexing wheels can be mounted to the back of the headstock for machining material with other machining heads mounted either horizontally or vertically on other way beds used with the two lathe beds. In another variation, a dead center or live center may be mounted to the back of the headstock for instant concentric centering of centered drilled material extending through the lathe spindle bore.

As a further advantage, the present system will allow the lathe operator to maintain extra way beds on hand in the shop for use in multiple way bed machining setups, such as mounting beds parallel to each other, or mounting beds at right angles or any angle to each other. This would allow the operator to set up vertical mills to work on material still in the lathe where extreme accuracy is needed. Such an arrangement would work well with indexing wheels mounted to the back of the headstock. A steady rest may also be mounted behind the headstock, to steady long pieces of material while machining. Some embodiments even provide a second cross-slide carriage to allow machining behind the headstock.

Another use of the present invention is to allow a horizontal drilling or milling head to be set up and left on a concentric center to the lathe for cross drilling or milling situations where speed is important. Further, the ability to keep an extra interchangeable way bed on hand would help in the scenario where one bed were to be damaged beyond repair, which frequently occurs when something heavy is dropped on one of the way beds. The current metalworking lathe designs do not provide any manner for maintaining a stable way bed while still allowing interchangeability in case of damage. The modular way bed 5 herein may be made in groups that are machine ground to the exact same specifications, thereby allowing them to be interchangeable with minimal adjustments in a typical shop environment.

Further, the present machine mounting block sliding lock system design may be turned vertically on one end with a strong floor base, thereby allowing conversion of a vertical bench mill to a floor based model. The design can also be employed in construction of new vertical mills.

Figure 8:
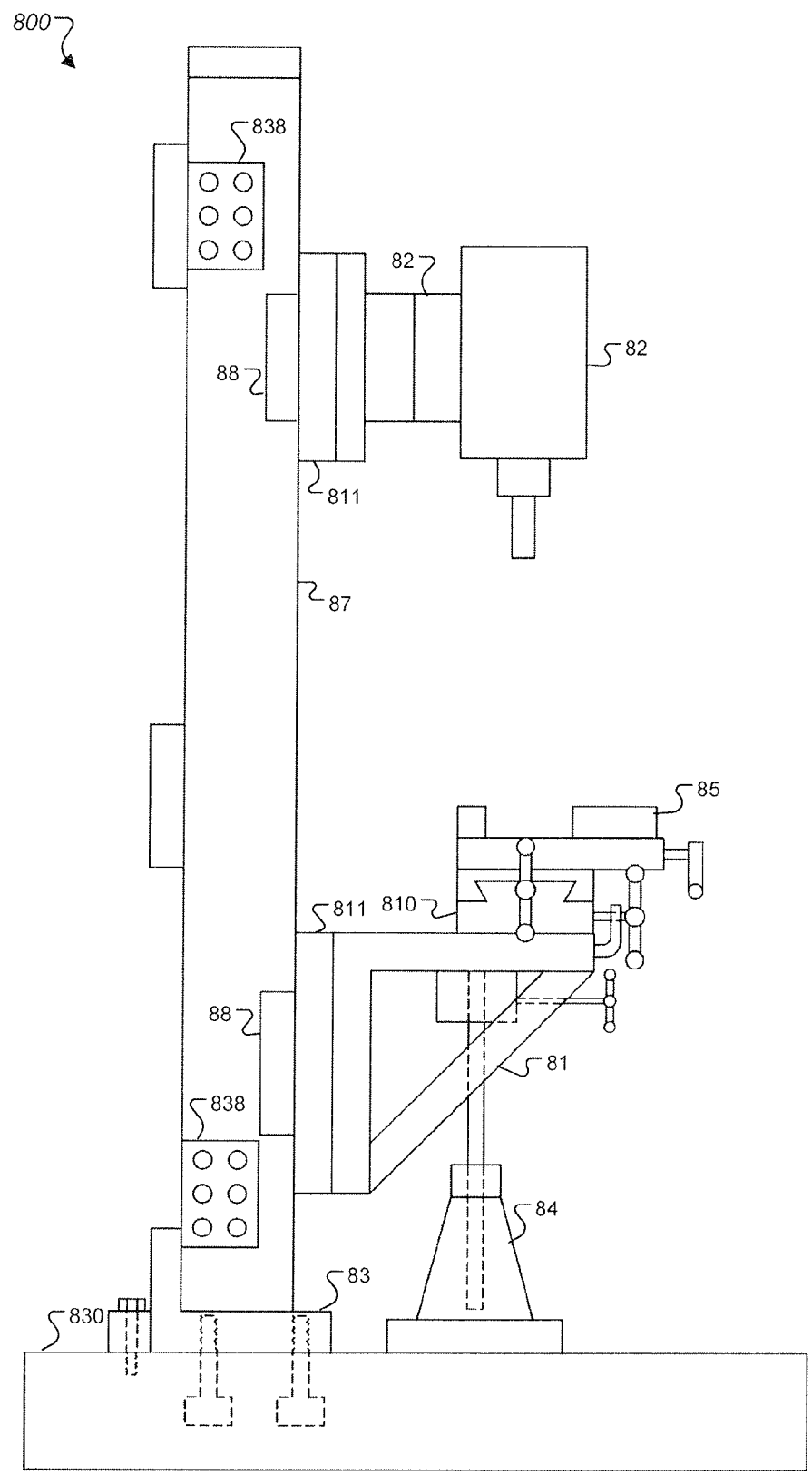
FIG. 8 and its accompanying description contain one embodiment of such a vertical mill.

FIG. 8 and its accompanying description contain one embodiment of such a vertical mill. A common problem in milling machines, such as bench mills, is that most are built with a round column on which the mill-drill head travels up and down. This means that once the mill head is loosened to raise or lower it, the centerline of the mill spindle to the previous milling or drilling operation on the material on the worktable is lost. Some designs and features help minimize such misalignment, but do not eradicate it. Another type of mill column is the square column with a dovetail way. This is an improvement over the round column, but also does not completely solve the problem. Both round and square columns are mounted on a flat base, and it is very difficult to maintain the mill headstock squareness with the mill table. Any deviation from the original square position and the mill arrangement loses its mill spindle concentricity to the material being machined when the mill head is moved up or down during machining operations. Imported versions of a knee mill provide some improvement, but have very limited movement in the knee. This problem may be addressed using bed tracks as described herein, but arranged in a vertical rather than horizontal position.

In the embodiment depicted in FIG. 8, a vertical mill 800 is constructed using two bed tracks 87 similar to those used in the lathe embodiment, but placed in the vertical position. Mounted on tracks 87 are the knee 81 and the mill head 82 which, once set up and aligned, will maintain its alignment throughout the mill's range of movement. This is because, just as with the lathe, both travel on the same way tracks 87. Such a design provides a machining distance much greater than the ordinary knee mill. A typical bench mill has a spindle to table distance of about 15 inches. A large knee mill will have a spindle to table distance of about 16 inches. A mill of the same overall height may employ the bed design herein to achieve a spindle to table distance of about 32 to 36 inches. Further, extensions may be added to the way bed if needed.

Tracks 87 are mounted to the depicted base 830 with a brace 83. End blocks 838 are attached between the two tracks 87 to provide a rigid fixed structure for the mill 800. The depicted knee 81 and mill head 82 are both mounted to tracks 87 with a respective machine mounting block 811. Each machine mount block 811 includes a sliding lock block 88, with a locking bar similar to that used in the lathe embodiment herein. A mill table 85 is mounted to mill knee 81, and provided with a cross-slide table 810 to allow lateral movement for milling operations. An elevation screw 84 supports knee 81 and moves it vertically using an elevation motor.

Figure 9:
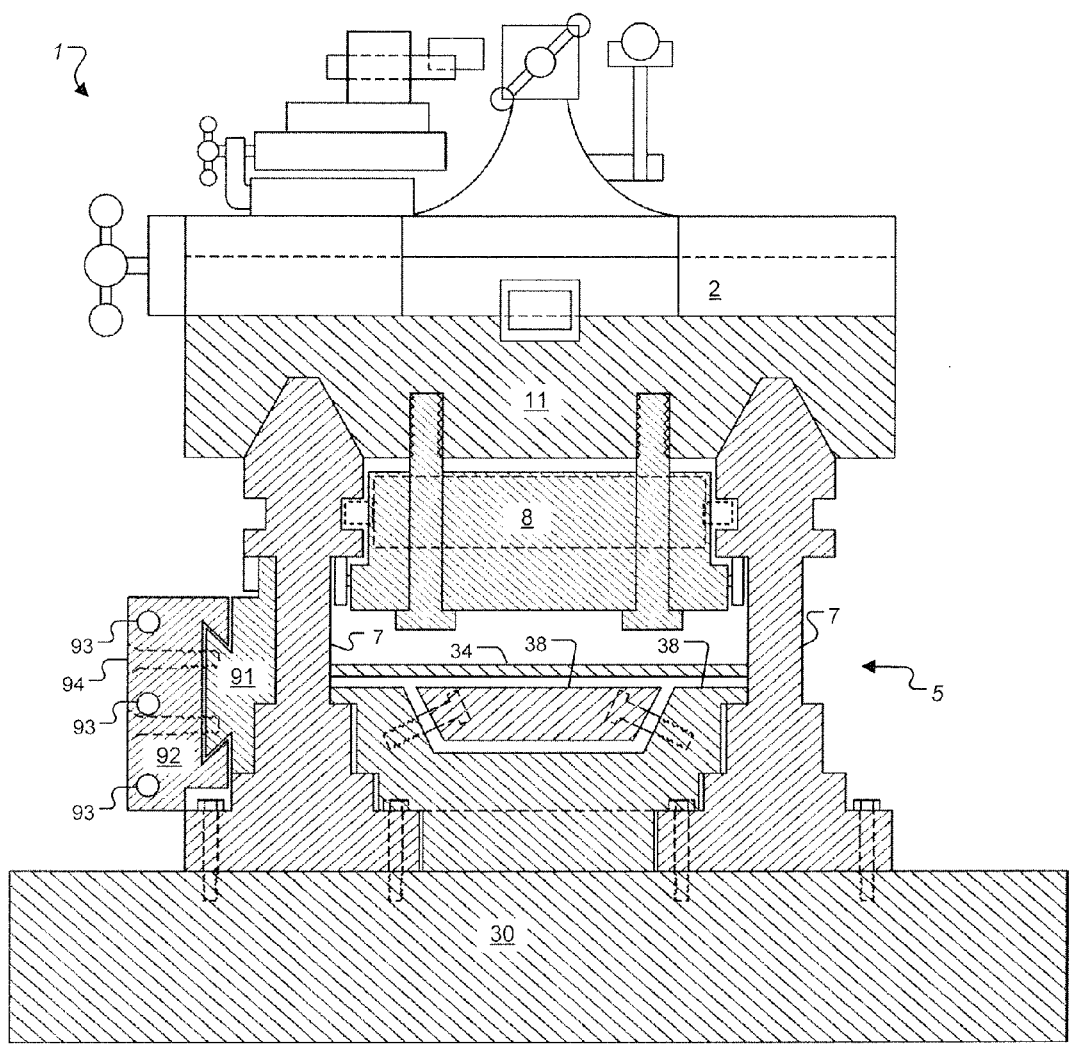
FIG. 9 is a cross section view of a lathe having a modular bed according to another embodiment.
Figure 10:
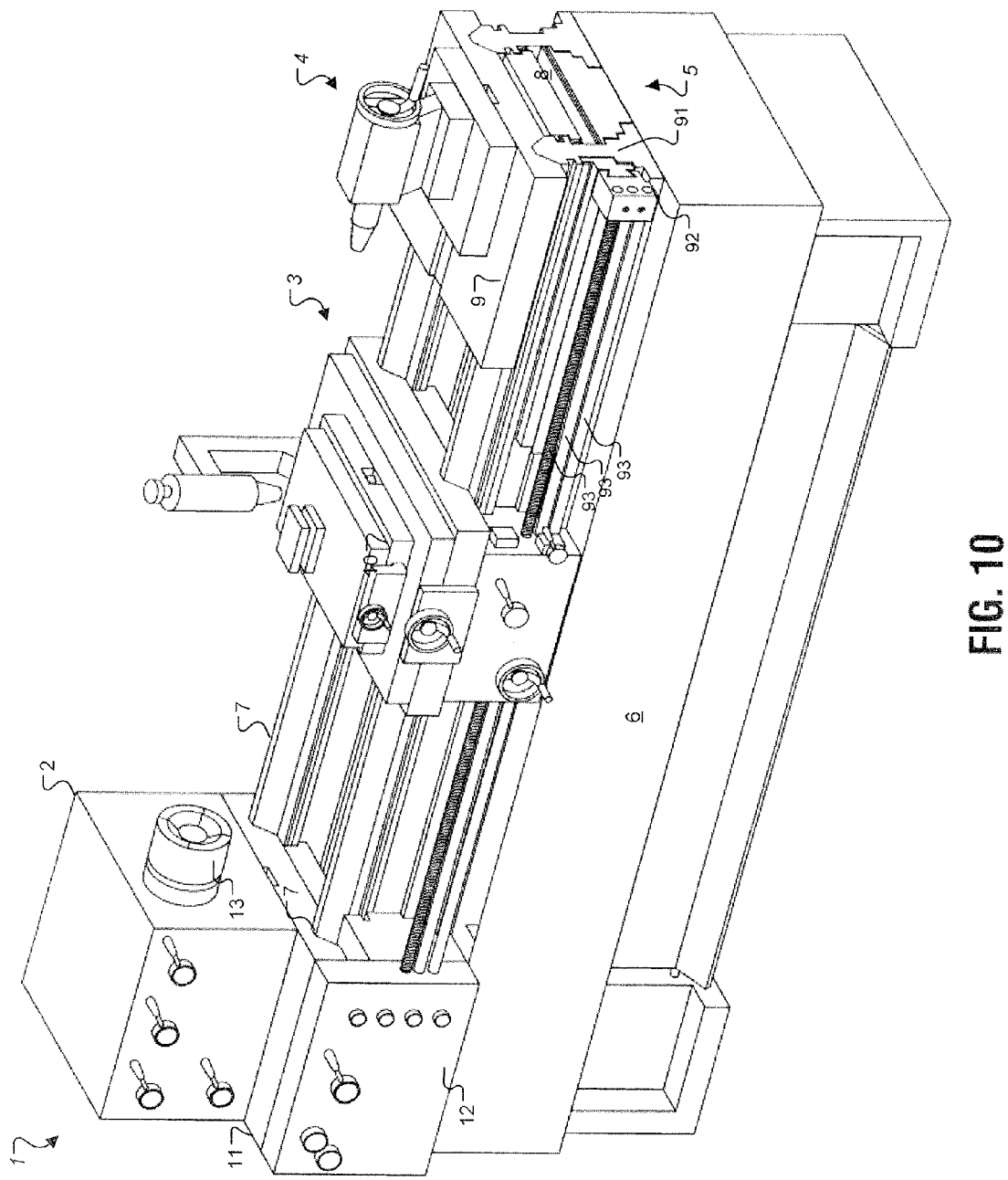
FIG. 10 is a perspective view of the lathe of FIG. 9.

FIG. 9 is a cross section view of a lathe having a modular bed according to another embodiment. FIG. 10 is a perspective view of the lathe of FIG. 9. With reference to both figures, the modular bed 5 is similar in this embodiment to that shown in FIG. 1, but includes an additional feature allowing improved reconfiguration of the lathe headstock. Specifically, an end support dovetail slide bar 91 is included, attached to the front of modular bed 5, and specifically to the front bed track 7. The end support dovetail slide bar may be referred to as simply "dovetail slide bar 91." The dovetail slide bar 91 as seen in cross section in FIG. 9 includes a dovetail extension designed to hold an end support block 92. This block 92 provides end support for the leadscrew, feed rod, and on off rod (all labeled 93) which are shown extending along the front of the bed 5 from the gearbox 12, though the carriage 3, and attaching to the end support block 92. The support block operates to allow the headstock to be moved or reconfigured to a different location along the bed tracks 7. The end support block 92 slides along the dovetail extension, allowing the ends of the depicted screws and rods 93 to move. Together, the dovetail slide bar 91 and the end block 92 may be referred to as a sliding rod support system. While a dovetail design is used in this preferred embodiment, any other suitable structure allowing a moveable end support block to receive the screws and rods 93 may be used. The end support block 92 may slide on rods or grooves, for example.

As seen in FIG. 10, dovetail slide bar 91 extends a set distance from the right end of the front bed track 7. As can be understood, the freedom of movement provided by bar 91 allows the headstock to be moved on its machine mounting block 11 an equal distance toward the left (FIG. 10), enabling movement along tracks 7 of modular bed 5, which may extend behind the headstock (toward the left of FIG. 10) in some embodiments, or another modular bed may be aligned having tracks 7 placed end to end with tracks 7 of the end of the depicted lathe assembly to provide an extended bed. To accomplish such movement, the headstock machine mounting block 11 locking bar is loosened (unlocked) and the locking bolts 94 of end support block 92 are loosened to allow end support block 92 to move freely along dovetail slide bar 91. The headstock 2 may then be repositioned by sliding it along bed tracks 7.

The sliding rod support system as described herein thereby allows the addition of bed track extensions on either end of the original bed tracks 7. The dovetail slide bar 91 may be extended the length of the track extensions on either side (i.e., the track extensions may be made to the right or the left (FIG. 10) or both to provide the full range of possible headstock movement along the modular bed 5). The slide bar 91 may extend to the left (as depicted), to the right along a right track extension, or both. An extension as used herein is simply an assembly of two bed tracks 7 of a desired length having at least two end blocks 38 and top inside alignment braces 34 as described with regard to the previous embodiments of a modular way bed 5.

In a typical metalworking lathe, the difference between the lathe feed rod and the leadscrew is that the feed rod is directly connected to the carriage rack gear bar with a small gear that extends out of the back of the carriage gearbox. This directly connects the carriage gearbox to the bed track, when the feed rod-leadscrew selector is engaged on the quick change gearbox 12 and starts the feed rod in motion. This allows the carriage movement in normal machining operations. The leadscrew, however, is not directly connected to the carriage rack gearbox. It is also set in motion by the feed rod-leadscrew selector on the quick change gearbox. You cannot have both rods in motion at the same time. The leadscrew moves the carriage only when the carriage gearbox half nuts are engaged. This is typically used in threading operations.

The importance of the leadscrew not being directly connected to the carriage rack gear box is that when the headstock lock bar bolts are loosened, and the leadscrew, feed rod and on off rod end support block blots are removed, and the cross-slide is centered on the bed with the cross-slide lock engaged, the headstock can be moved in motion by the leadscrew and half nuts when engaged. This movement or repositioning is stopped by disengaging the half nuts. Such a movement is useful for certain operations such as boring operations for a material too long or large to be mounted on the cross-slide. Such a material may be bored by locking the cross-slide and using headstock movement to perform the boring operation. This would not be possible without the ability to have the bed track extend left beyond the headstock as described herein. Further, the boring bar may be mounted in collets on the headstock and tailstock so that the boring bar is connected to both headstock and tailstock without falling loose when moved. This is possible because of the sliding lock block system tailstock and headstock, which allows the tailstock to slide along with movement of the headstock when unlocked.

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A lathe comprising:
   (b) a headstock with a drivable rotatable chuck providing a spindle axis;
   (c) a tailstock mounted opposite the headstock along the spindle axis;
   (d) a carriage adapted to move longitudinally between the headstock and tailstock, the carriage adapted to hold a tool bit for operating on a rotating workpiece; and
   (e) a modular lathe bed track system including
      (i) a base;
      (ii) two bed tracks that are removably attached to the base and extend under the headstock, carriage, and tailstock, and each include a shaped upper track surface, an accessory slot formed between an upper portion of the bed track and an accessory ledge, the accessory ledge having a downward-facing surface;
      (iii) first and second end blocks positioned at first and second ends of the modular lathe bed track system separating the two bed tracks;

(iv) a first repositionable machine mounting block assembly supporting the headstock and resting on the two bed tracks, and comprising a machine mounting block having two slots shaped to match the bed track upper track surfaces, a sliding lock block attached to the machine mounting block and positioned under the machine mounting block and adapted to move against the accessory ledge downward-facing surface in a manner to stabilize the machine mounting block, a sliding lock bar provided in a recess formed in the sliding lock block, and at least one locking bolt positioned to enable pressure to be applied from the sliding lock bar on the ledge downward-facing surface;

(v) a second machine mounting block assembly supporting the tailstock; and (vi) a third machine mounting block assembly supporting the carriage.

2. The lathe of claim 1, wherein the bed tracks are constructed with a top alignment brace ledge beneath the accessory ledge downward-facing surface.

3. The lathe of claim 1, wherein the bed tracks are constructed with an end block alignment ledge beneath the accessory ledge downward-facing surface.

4. The lathe of claim 1, wherein the sliding lock block is adapted to move against the accessory ledge downward-facing surface by applying pressure on the downward-facing surface through bearings mounted along an edge of the sliding lock block.

5. The lathe of claim 1, wherein the sliding lock block is attached to the machine mounting block with a plurality of bolts.

6. The lathe of claim 1, wherein the two bed tracks extend past the headstock on a side opposite the tailstock, and further comprising a leadscrew, feed rod, and on off rod that are slidable along a sliding rod support system attached to a front one of the bed tracks.

7. The lathe of claim 6, wherein the sliding rod support system comprises an end support block moveable along an extension attached to the front bed track, allowing the ends of the leadscrew, feed rod, and on off rod to move.

8. A modular lathe bed track system for use in a lathe that includes a headstock with a drivable rotatable chuck providing a spindle axis, a tailstock mounted opposite the headstock along the spindle axis, a carriage adapted to move longitudinally between the headstock and tailstock, the carriage adapted to hold a tool bit for operating on a rotating workpiece, and a lathe base, the system comprising:

(a) two bed tracks that are adapted to be removably attached to the lathe base and to extend under the headstock, carriage, and tailstock, each bed track including a shaped upper track surface, an accessory slot formed between an upper portion of the bed track and an accessory ledge, the accessory ledge having a downward-facing surface;

(b) first and second end blocks positioned at first and second ends of the modular lathe bed track system separating the two bed tracks;

(c) a first repositionable machine mounting block assembly adapted for supporting the headstock and resting on the two bed tracks, and comprising a machine mounting block having two slots shaped to match the bed track upper track surfaces, a sliding lock block attached to the machine mounting block and positioned under the machine mounting block and adapted to move against the accessory ledge downward-facing surface in a manner to stabilize the machine mounting block, a sliding lock bar provided in a recess formed in the sliding lock block, and at least one locking bolt positioned to enable pressure to be applied from the sliding lock bar on the accessory ledge downward facing surface;

(d) a second machine mounting block assembly supporting the tailstock; and (e) a third machine mounting block assembly supporting the carriage.

9. The modular lathe bed track system of claim 8, wherein the bed tracks are constructed with a top alignment brace ledge beneath the accessory ledge downward-facing surface.

10. The modular lathe bed track system of claim 8, wherein the bed tracks are constructed with an end block alignment ledge beneath the accessory ledge downward-facing surface.

11. The modular lathe bed track system of claim 8, wherein the sliding lock block is adapted to move against the accessory ledge downward-facing surface by applying pressure on the downward-facing surface through bearings mounted along an edge of the sliding lock block.

12. The modular lathe bed track system of claim 8, wherein the sliding lock block is attached to the machine mounting block with a plurality of bolts.

13. The modular lathe bed track system of claim 8, wherein the two bed tracks extend past the headstock on a side opposite the tailstock, and further comprising a leadscrew, feed rod, and on off rod that are slidable along a sliding rod support system attached to a front one of the bed tracks.

14. The modular lathe bed track system of claim 13, wherein the sliding rod support system comprises an end support block moveable along an extension attached to the front bed track, allowing the ends of the leadscrew, feed rod, and on off rod to move.

15. A modular lathe bed track system for use in a lathe that includes a headstock with a drivable rotatable chuck providing a spindle axis, a tailstock mounted opposite the headstock along the spindle axis, a carriage adapted to move longitudinally between the headstock and tailstock, the carriage adapted to hold a tool bit for operating on a rotating workpiece, and a lathe base, the system comprising:

(a) two bed tracks that are adapted to be removably attached to the lathe base and to extend at least under the carriage and tailstock, each bed track including a shaped upper track surface, an accessory slot formed between an upper portion of the bed track and an accessory ledge, the accessory ledge having a downward-facing surface;

(b) first and second end blocks positioned at first and second ends of the modular lathe bed track system separating the two bed tracks;

(c) a first repositionable machine mounting block assembly adapted for supporting the carriage and resting on the two bed tracks, and comprising a machine mounting block having two slots shaped to match the bed track upper track surfaces, a sliding lock block attached to the machine mounting block and positioned under the machine mounting block and adapted to move against the accessory ledge downward-facing surface in a manner to stabilize the machine mounting block, a sliding lock bar provided in a recess formed in the sliding lock block, and at least one locking bolt positioned to enable pressure to be applied from the sliding lock bar on the accessory ledge downward facing surface; and (d) a second machine mounting block assembly supporting the tailstock.

16. The modular lathe bed track system of claim 15, wherein the bed tracks are constructed with a top alignment brace ledge beneath the accessory ledge downward-facing surface.

17. The modular lathe bed track system of claim 15, wherein the bed tracks are constructed with an end block alignment ledge beneath the accessory ledge downward-facing surface.

18. The modular lathe bed track system of claim 15, wherein the sliding lock block is adapted to move against the accessory ledge downward-facing surface by applying pressure on the downward-facing surface through bearings mounted along an edge of the sliding lock block.

19. The modular lathe bed track system of claim 15, wherein the sliding lock block is attached to the machine mounting block with a plurality of bolts.

20. The modular lathe bed track system of claim 15, wherein the two bed tracks extend past the headstock on a side opposite the tailstock, and further comprising a leadscrew, feed rod, and on off rod that are slidable along a sliding rod support system attached to a front one of the bed tracks.

* * * * *